United States Patent
Allen et al.

[11] Patent Number: 6,109,022
[45] Date of Patent: Aug. 29, 2000

[54] TURBOFAN WITH FRANGIBLE ROTOR SUPPORT

[75] Inventors: John W. Allen; Kenneth F. Udall, both of Derby, United Kingdom

[73] Assignee: Rolls-Royce plc, London, United Kingdom

[21] Appl. No.: 09/102,059

[22] Filed: Jun. 22, 1998

[30] Foreign Application Priority Data

Jun. 25, 1997 [GB] United Kingdom .................. 9713296

[51] Int. Cl.[7] ........................................................ F02K 3/04
[52] U.S. Cl. ........................ 60/223; 60/39.091; 60/226.1
[58] Field of Search ................................ 60/39.091, 223, 60/226.1; 415/9; 416/2

[56] References Cited

U.S. PATENT DOCUMENTS

| | | | |
|---|---|---|---|
| 3,727,998 | 4/1973 | Haworth et al. | 416/170 R |
| 4,452,567 | 6/1984 | Treby et al. | 416/2 |
| 5,433,584 | 7/1995 | Amin et al. | 415/9 |
| 5,791,789 | 8/1998 | Van Duyn et al. | 416/2 |
| 5,974,782 | 11/1999 | Gerez | 60/223 |
| 6,009,701 | 1/2000 | Freeman et al. | 60/223 |

FOREIGN PATENT DOCUMENTS

| | | |
|---|---|---|
| 2079402 | 1/1982 | United Kingdom . |
| 2130340 | 5/1984 | United Kingdom . |

*Primary Examiner*—Louis J. Casaregola
*Attorney, Agent, or Firm*—W. Warren Taltavull; Farkas & Manelli PLLC

[57] ABSTRACT

A ducted fan gas turbine engine (10) is provided with a fan (12) which is carried by a shaft (16). A frangible support member (27) maintains a coaxial relationship between the shaft (16) and the longitudinal axis (15) of the engine (10). In the event of severe damage to the fan (12), the frangible member (27) fractures, allowing the shaft (16) carrying the fan (12) to orbit about the engine longitudinal axis (15). A resilient support member (33,45) exerts a radially inward restoration force on the shaft (16) carrying the fan (12) to reduce vibration.

9 Claims, 4 Drawing Sheets

6,109,022

TURBOFAN WITH FRANGIBLE ROTOR SUPPORT

This invention relates to a ducted fan gas turbine engine and is particularly concerned with the preservation of the integrity of such an engine following damage to its fan.

Ducted fan gas turbine engines conventionally comprise a core engine which drives a comparatively large diameter propulsive fan positioned at the upstream end of the core engine. The fan is thus vulnerable to damage as a result of foreign object ingestion by the engine. In most cases, the fan is sufficiently robust to withstand the effects of such foreign object ingestion and is able to continue operating, although, perhaps at reduced efficiency.

On very rare occasions, the fan may be damaged to such an extent that parts of one or more of the aerofoil blades that make up the fan are lost. This usually necessitates the shutting-down of the engine involved to minimise the hazard to the aircraft carrying it. However, the imbalance in the fan created by the blade loss generates extremely high radial loads which must at least be partially absorbed as the engine is run-down to windmilling speed. Windmilling speed is the speed at which the engine rotates in a non-operative condition as a result of its motion through the atmosphere.

One way in which fan imbalance load absorption can be achieved is by the use of so-called "fuse pins". Typically the main bearing supporting the shaft carrying the fan is connected to the remainder of the engine structure in the region of the fan via a plurality of axially extending fuse pins. In the event of a major fan imbalance, the resultant high radial loads exerted by the fan upon the shaft cause the fuse pins to fracture in shear, so allowing the fan and its shaft to orbit about the engine's longitudinal axis. This continues as the engine is allowed to run-down to windmilling speed. Such arrangements are disclosed in GB2079402 and GB2130340.

Unfortunately, under certain circumstances, the vibration resulting from the fan imbalance that still exits at windmilling speed can still be extremely severe. This is due mainly to the natural frequency of vibration of the fan and the lack of radial stiffness of the fan assembly.

It is an object of the present invention to provide a ducted fan gas turbine engine in which the natural frequency of vibration of the fan at windmilling speeds is modified to reduce vibration.

According to the present invention, a ducted fan gas turbine engine having a longitudinal axis includes a propulsive fan mounted on a first shaft and a compressor mounted on a second shaft, said shafts being normally coaxial both with each other and with said engine longitudinal axis, and respectively supported at their upstream ends by axially spaced apart first and second bearing members, said first bearing member being supported from fixed structure of said engine by radially frangible support means, and said second bearing member being supported from said fixed structure of said engine, and additionally interconnected with said first bearing member, by radially resilient support means.

Said radially resilient support means preferably comprises a portion interconnecting said first and second bearing members which is in the form of a hollow cylindrical piece coaxial with said engine longitudinal axis.

Said hollow cylindrical piece may cooperate with said first shaft to define an enclosed lubrication chamber which at least partially contains said first and second bearings to facilitate the lubrication thereof.

Said radially resilient support means preferably comprises at least two radially spaced apart, serially interconnected, generally axially extending sleeves configured so as to define at least one hairpin cross-section shape.

The regions of interconnection between said sleeves may be thickened with respect to the remainder of said sleeves.

Said radially resilient support means may be a unitary structure.

Said resilient support means may be formed from a titanium alloy.

Said frangible support means is preferably an annular component of dished configuration.

Said engine is preferably a three shaft engine comprising said first shaft carrying said fan and a low pressure turbine, said second shaft carrying an intermediate pressure compressor and an intermediate pressure turbine, and a third shaft carrying a high pressure compressor and a high pressure turbine.

The present invention will now be described, by way of example, with reference to the accompanying drawings in which.

Figure 1:
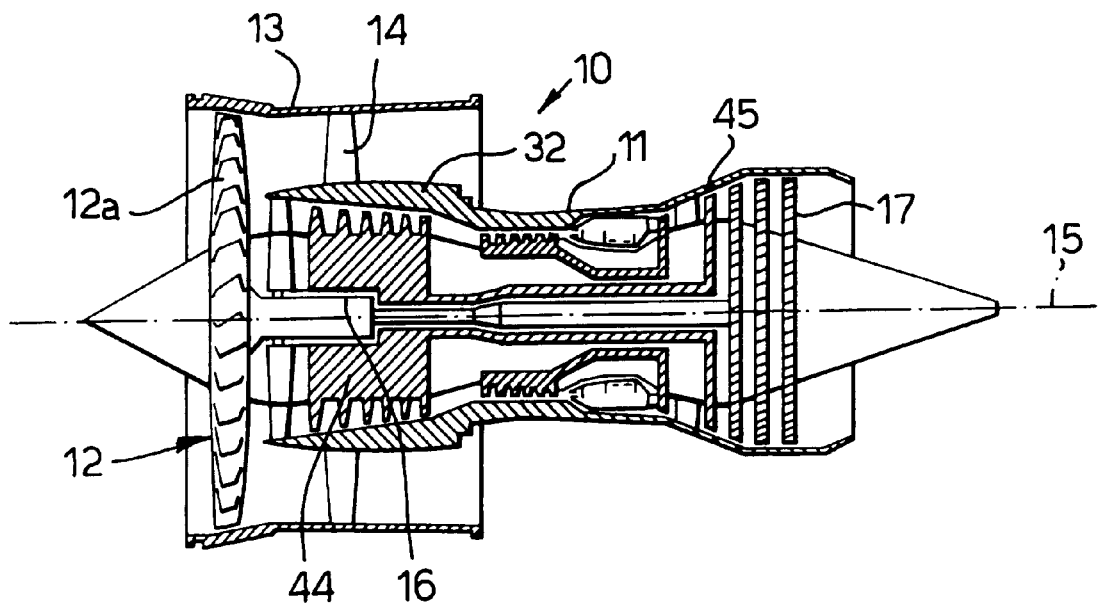
FIG. 1 is a schematic sectioned side view of a ducted fan gas turbine engine in accordance with the present invention.

With reference to FIG. 1, a ducted fan gas turbine engine generally indicated at 10 is of mainly conventional construction. It comprises a core engine 11 which functions in the conventional manner to drive a propulsive fan 12 mounted at the upstream end of the core engine 11 (the term "upstream" as used herein is with respect to the general direction of gas flow through the engine 10, that is, from left to right as viewed in FIG. 1). The propulsive fan 12 comprises an annular array of radially extending aerofoil blades 12a and is positioned within a fan casing 13 which is supported from the core engine 11 by an annular array of generally radially extending outlet guide vanes 14. The ducted fan gas turbine engine 10 has a longitudinal axis 15 about which its major rotational parts rotate.

Figure 2:
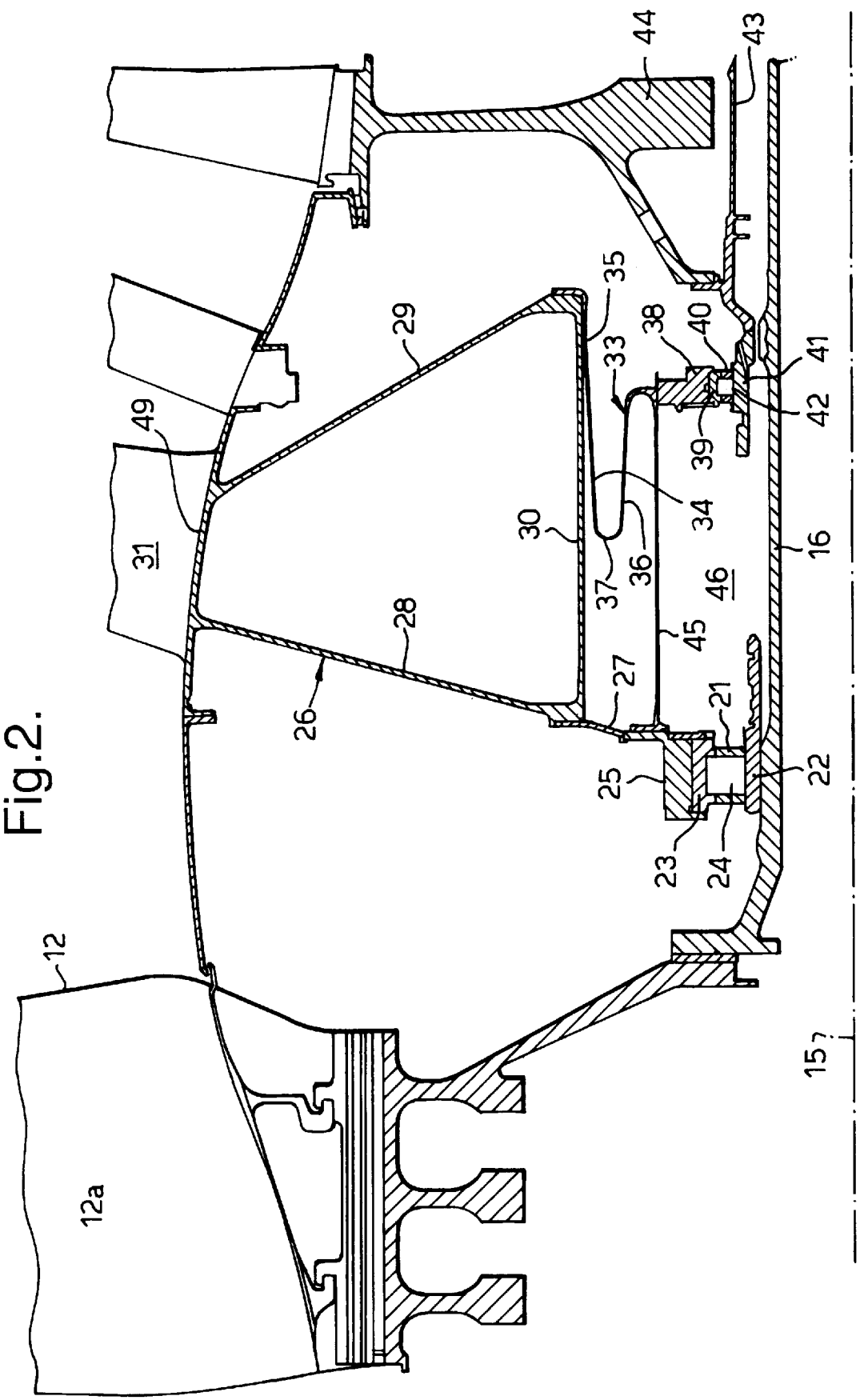
FIG. 2 is a sectioned side view, on an enlarged scale, of a portion of the ducted fan gas turbine engine shown in FIG. 1.

The fan 12 is mounted on a first shaft 16 which, under normal circumstances, is coaxial with the engine longitudinal axis 15 and which is driven in the conventional manner by the low pressure turbine 17 of the core engine 11. The manner in which the upstream region of the first shaft 16 is supported from the fixed structure of the engine 10 can be seen if reference is now made to FIG. 2.

The first shaft 16 extends almost the whole length of the ducted fan gas turbine engine 10 to interconnect the fan 12 and the low pressure turbine 17 of the core engine 11. The first shaft 16 is supported from the remainder of the core engine 11 by a number of roller bearings, one of which 21 supports the upstream end of the first shaft 16. The first roller bearing 21 comprises a radially inner race 22, which is located upon the external surface of a portion of the first shaft 16, a radially outer race 23 and a plurality of roller bearing elements 24 which are interposed in an annular array between the inner and outer races 22 and 23.

The radially outer race 23 is carried by a support ring 25 which is attached to the fixed structure 26 of the core engine 11 by a frangible support member 27. The frangible support member 27 is in the form of a ring which is coaxial with the engine axis 15. It is slightly dished and of such a thickness that it will fracture when subjected to radial loads above a pre-determined magnitude. The fixed structure 26 is in the form of two annular panels 28 and 29 which are axially spaced apart at their radially inner extents by a cylindrical part 30. Their radially outer extents are interconnected by an annular member configured to define the radially inner platforms 49 of an annular array of stator aerofoil vanes 31 which are positioned immediately downstream of the fan 12. The vanes 31 are attached, in turn, to to the outer casing 32 of the core engine 11.

The fixed structure 26 additionally carries an annular resilient support member 33 at its downstream end. The member 33 is formed from a suitably resilient sheet material. Thus, for instance, the member 33 could be formed from an appropriate titanium alloy.

The member 33 is configured so that a portion 34 thereof is of a generally hairpin cross-sectional shape. Thus the hairpin shape portion 34 is defined by two radially spaced apart, generally axially extending, annular sleeves 35 and 36 which are interconnected by a curved section 37. The hairpin shape portion 34 of the member 33 interconnects the core engine fixed structure 26 with a support ring 38 which carries the radially outer race 39 of a second roller bearing 40. The second roller bearing 40 additionally comprises a radially inner race 41 and an annular array of roller bearing elements 42 interposed between the radially inner and outer races 39 and 41.

The second roller bearing 40 is coaxial with both the first roller bearing 21 and the engine longitudinal axis 15, and the first and second roller bearings 21 and 40 are axially spaced apart from each other. The second roller bearing 40 supports the upstream end of a second shaft 43 which is hollow and is located radially outwardly of the first shaft 16. The second shaft 43 carries the intermediate pressure compressor 44 and intermediate pressure turbine 45 of the core engine 11 (as can be seen in FIG. 1).

The annular resilient member 33 additionally comprises a hollow cylindrical portion 45 which interconnects support ring 38 of the second roller bearing 40 and the support ring 25 of the first roller bearing 21. Thus, under normal operating conditions, the second shaft 43 is supported by the annular resilient support member 33 from both axial extents of the engine fixed structure 26. The resilience of the support member 33 under such normal operating conditions is selected so that the second shaft 43 and the structures that it carries are maintained in a generally constant coaxial relationship with the engine longitudinal axis 15.

Although the hollow cylindrical portion 45 and hairpin shape portion 34 are shown as a unitary component, it will be appreciated that this is not in fact essential and that they could be separate items if so desired.

The hollow cylindrical portion 45 of the annular resilient member 33 serves to cooperate with the first shaft 16 to define an annular chamber 46 which contains both of the first and second bearings 21 and 40. The chamber 46 provides a convenient means for containing lubricating oil directed to the bearings 21 and 40. The oil is derived in a conventional manner from suitable supply conduits (not shown).

Figure 3:
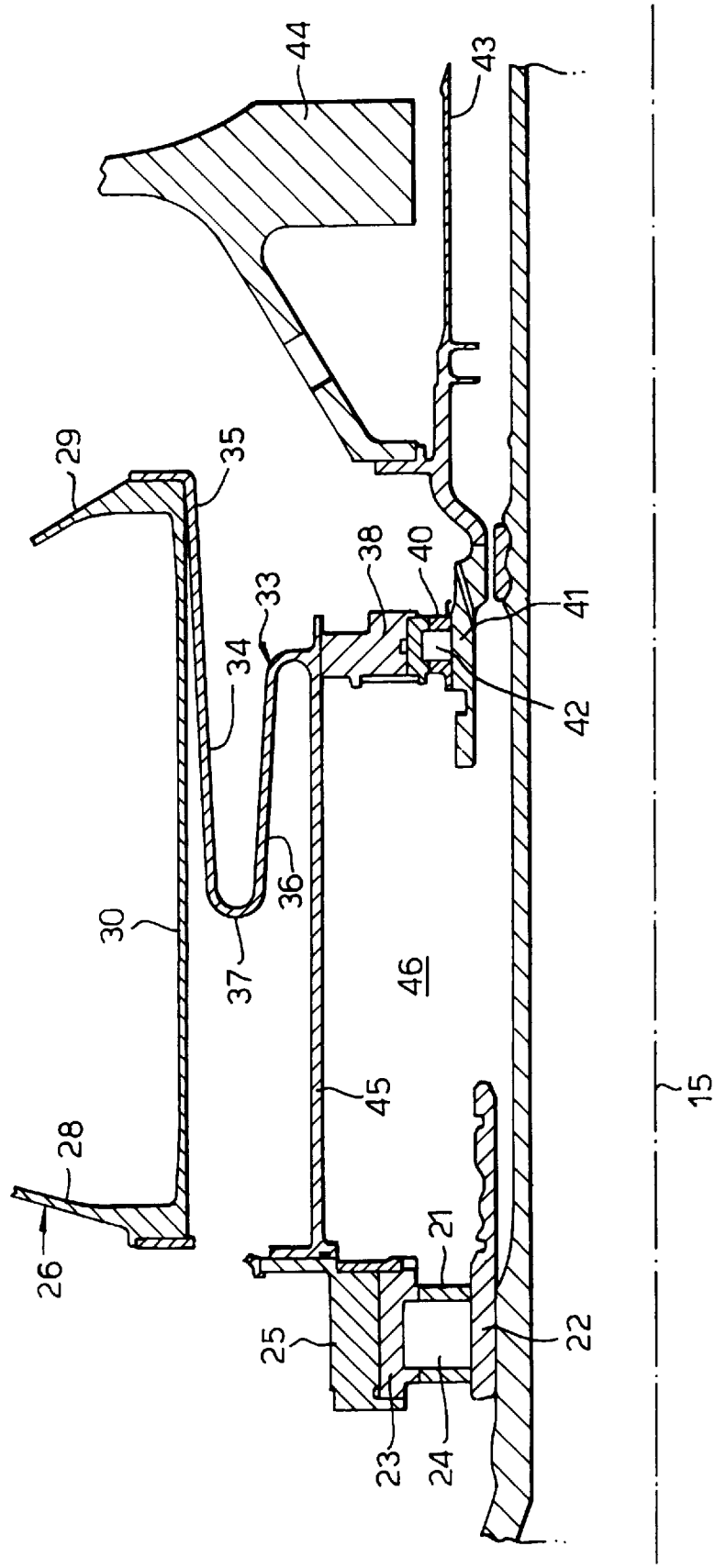
FIG. 3 is a view, on an enlarged scale, of a portion of the view shown in FIG. 2 following the failure of the frangible support means.

In the event of the fan 12 suffering damage to one or more of its aerofoil blades 12a which places it significantly out-of-balance, considerable radial loads are transmitted from the first shaft 16 to the first bearing 21. This, in turn, places radial loads upon the frangible support member 27 which are sufficient to fracture that support member 27. This can be seen if reference is now made to FIG. 3.

The fracture of the frangible support member 27 ensures that the most of the core engine 11 is protected from major damage arising from the out-of-balance radial loads exerted by the fan 12. However, the fracture of the frangible support member 27 also results in the upstream ends of the first and second shafts 16 and 43 no longer having rigid radial support. Consequently, the upstream end of the first shaft 16 and 43 proceeds to orbit about the engine longitudinal axis 15. This, in turn, results in the bearing support ring 25 following that orbiting motion.

Conventionally, following major fan damage, the fuel flow to the engine 10 is discontinued and the fan 12 is allowed to run down to windmilling speed. However, at windmilling speeds, there is a likelihood of the fan 12 approaching its natural frequency of vibration which could result in the fan vibrating to such an extent that the integrity of the engine 10 is threatened.

In order to alter the natural frequency of the fan 12 to a value at which such damaging vibration does not occur, a radial restoration force is applied to the first shaft 16. This restoration force is applied by the annular resilient support member 33. More specifically, the hollow cylindrical portion 45 of the resilient member 33 functions as a cantilevered shear spring between the first and second bearing support rings 25 and 38. The resilient hollow cylindrical portion 45 therefore tends to act to restore a generally coaxial relationship between the first and second shafts 16 and 43.

As a result of this radially resilient interconnection between the first and second shafts 16 and 43, certain out-of-balance loads are transferred from the first shaft 16 to the second shaft 43. It is important that these loads are absorbed as much as possible in order to minimise the radial loading upon the remainder of the core engine 11. That radial load absorption is provided by the remainder of the annular resilient member 33, that is, the hairpin shape cross-section portion 34. Thus the hairpin shape cross-section portion 34 of the annular resilient member 33 provides a radially resilient interconnection between the first and second shafts 16 and 43 and the engine fixed structure 26, thereby providing that radial load absorption.

Since the hollow cylindrical portion 45 of the annular resilient member 33 continues to define the annular chamber 46 following the fracture of the frangible support member 27, the supply of lubricant to the first bearing 21 is uninterrupted. Consequently during windmilling, the danger of the first bearing 21 failing through lack of lubrication is minimised.

It will be appreciated that the hollow cylindrical portion 45 need not necessarily be without apertures in order to enable it to fulfil its function of providing radial resilience. However, if it did contain apertures, other suitable lubricant supply means would have to be provided in order to ensure adequate lubrication of the first bearing 21 and perhaps the second bearing 40.

Figure 4:
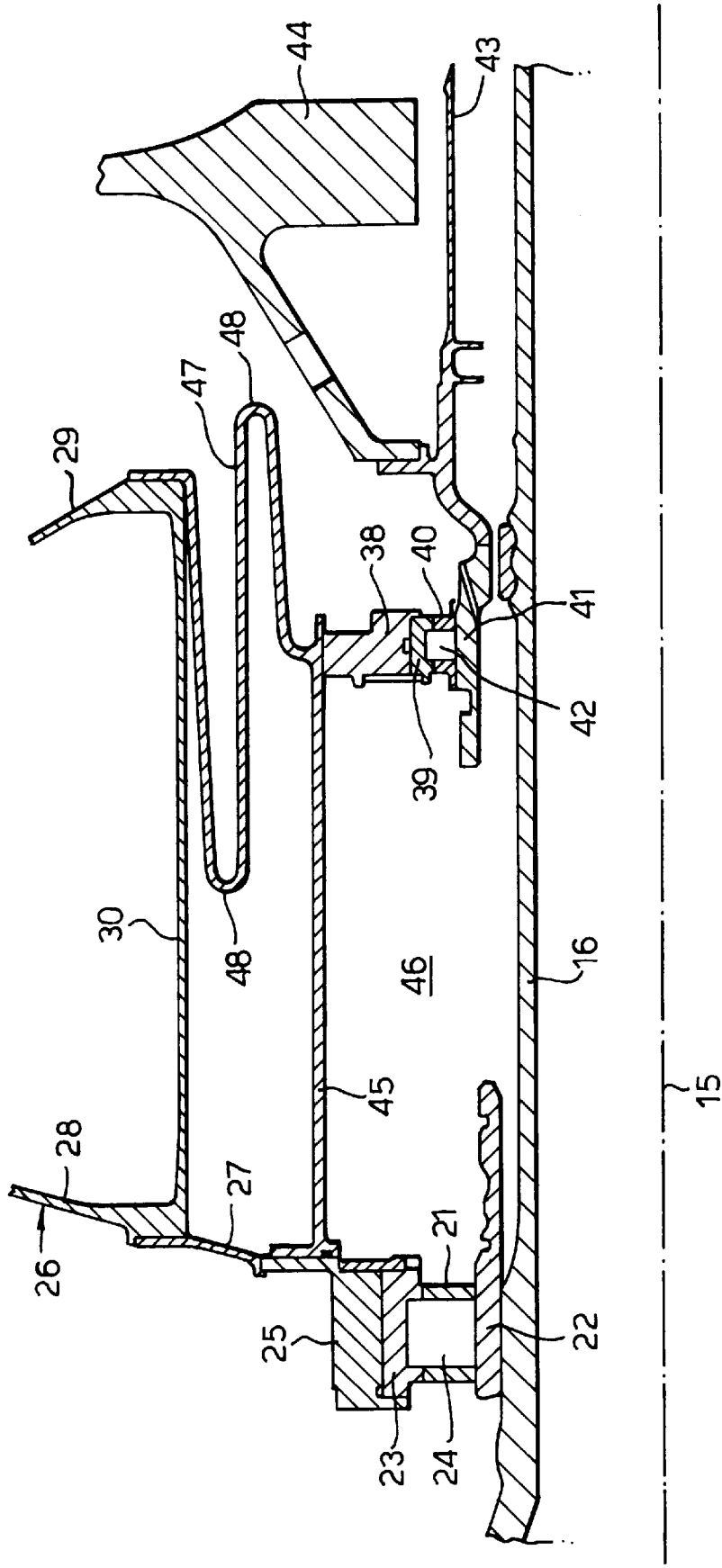
FIG. 4 is a view, on an enlarged scale, of a portion of the view shown in FIG. 2 showing a further embodiment of the present invention.

It will also be appreciated that the portion of the annular resilient member 33 interconnecting the second bearing support ring 38 and the fixed engine structure 26 need not necessarily be of the single hairpin shape cross-section described earlier in order to provide the desired degree of radial resilience. For instance, it could be of a double hairpin shape cross-section 47 as shown in FIG. 4. All of the remaining features of the embodiment shown in FIG. 4 correspond with those described in the embodiment described with respect to FIGS. 1–3 and are numbered accordingly.

A further feature of the embodiment shown in FIG. 4 is that the curved sections 48 of the member 47 are thickened locally. This is to ensure that the member 47 resists any tendency of the first and second shafts 16 and 43 to move axially following the fracture of the frangible support member 27.

It will be seen that the present invention provides a means for altering the natural frequency of vibration of the fan 12 during windmilling conditions which is both light and compact. Moreover, it is not a mechanism as such and therefore there is less chance of it not functioning satisfactorily should the frangible support member 27 fracture.

We claim:

1. A ducted fan gas turbine engine having a longitudinal axis and including a propulsive fan and a first shaft, said propulsive fan mounted on said first shaft, a second shaft and a compressor mounted on said second shaft, said shafts being normally coaxial both with each other and with said engine longitudinal axis, axially spaced apart first and second bearing members, said shafts being respectively supported at their upstream ends by said first and second bearing members, said engine having fixed structure, radially frangible support means, and radially resilient support means, said first bearing member being supported from said fixed structure of said engine by said radially frangible support means, and said second bearing member being supported from said fixed structure of said engine, and additionally interconnected with said first bearing member, by said radially resilient support means.

2. A ducted fan gas turbine engine as claimed in claim 1 wherein said radially resilient support means comprises a portion interconnecting said first and second bearing members in the form of a hollow cylindrical piece which is coaxial with said engine longitudinal axis.

3. A ducted fan gas turbine engine as claimed in claim 2 wherein said hollow cylindrical piece cooperates with said first shaft to define an enclosed lubrication chamber which at least partially contains said first and second bearings to facilitate the lubrication thereof.

4. A ducted fan gas turbine engine as claimed in claim 1 wherein said radially resilient support means comprises at least two radially spaced apart, serially interconnected, generally axially extending sleeves configured so as to define at least one hairpin cross-section shape.

5. A ducted fan gas turbine engine as claimed in claim 4 wherein the regions of interconnection between said sleeves are thickened with respect to the remainder of said sleeves.

6. A ducted fan gas turbine engine as claimed in claim 1 wherein said radially resilient support means is a unitary structure.

7. A ducted fan gas turbine engine as claimed in claim 6 wherein said resilient support means is formed from a titanium alloy.

8. A ducted fan gas turbine engine as claimed in claim 1 wherein said frangible support means is an annular component of dished configuration.

9. A ducted fan gas turbine engine as claimed in claim 1 wherein said engine is a three shaft engine comprising said first shaft carrying said fan and a low pressure turbine, said second shaft carrying an intermediate pressure compressor and an intermediate pressure turbine, and a third shaft carrying a high pressure compressor and a high pressure turbine.

* * * * *